(12) United States Patent
Arumugham et al.

(10) Patent No.: US 8,745,589 B2
(45) Date of Patent: Jun. 3, 2014

(54) AUTOMATIC EXTRACTION OF TEST CASE FOR A BUILD IN TESTING LIFECYCLE

(75) Inventors: Prabhu Arumugham, Chennai (IN); Nisha Augustine, Chennai (IN); Ruby Felecia Noel, Chennai (IN); Bhanu Raju, Chennai (IN); Prabhu Subramaniam, Chennai (IN)

(73) Assignee: Tata Consultancy Services LimitedIN (US)

(*) Notice: Subject to any disclaimer, the term of this patent is extended or adjusted under 35 U.S.C. 154(b) by 278 days.

(21) Appl. No.: 13/100,944

(22) Filed: May 4, 2011

(65) Prior Publication Data
US 2012/0198421 A1    Aug. 2, 2012

(30) Foreign Application Priority Data
Jan. 31, 2011    (IN) ............................ 261/MUM/2011

(51) Int. Cl.
*G06F 9/44*    (2006.01)

(52) U.S. Cl.
USPC ............................ 717/125; 717/126; 717/175

(58) Field of Classification Search
USPC .................. 717/124–131, 168–170, 175; 709/203–204
IPC ....................... G06F 8/10,8/20, 8/24, 8/35, 8/36
See application file for complete search history.

(56) References Cited

U.S. PATENT DOCUMENTS

| | | | | |
|---|---|---|---|---|
| 5,475,843 A * | 12/1995 | Halviatti et al. | ............... | 717/124 |
| 6,636,886 B1 * | 10/2003 | Katiyar et al. | ............... | 709/203 |
| 6,934,934 B1 * | 8/2005 | Osborne et al. | ............... | 717/126 |
| 7,055,137 B2 * | 5/2006 | Mathews | ............... | 717/125 |
| 7,080,371 B1 * | 7/2006 | Arnaiz et al. | ............... | 717/170 |
| 7,167,870 B2 * | 1/2007 | Avvari et al. | ............... | 717/124 |
| 7,272,823 B2 * | 9/2007 | Ball | ............... | 717/125 |
| 7,334,219 B2 * | 2/2008 | Cebula et al. | ............... | 717/124 |
| 7,392,509 B2 * | 6/2008 | Sinha et al. | ............... | 717/126 |
| 7,490,319 B2 * | 2/2009 | Blackwell et al. | ............... | 717/124 |
| 7,506,312 B1 * | 3/2009 | Girolami-Rose et al. | .... | 717/124 |
| 7,665,068 B2 * | 2/2010 | Neumann et al. | ............... | 717/125 |
| 7,784,044 B2 * | 8/2010 | Buban et al. | ............... | 717/168 |
| 7,840,944 B2 * | 11/2010 | Brunswig et al. | ............... | 717/124 |
| 7,865,888 B1 * | 1/2011 | Qureshi et al. | ............... | 717/168 |
| 7,950,004 B2 * | 5/2011 | Vieira et al. | ............... | 717/125 |
| 8,001,532 B1 * | 8/2011 | Jakubiak et al. | ............... | 717/125 |
| 8,117,261 B2 * | 2/2012 | Briere et al. | ............... | 709/204 |
| 8,245,194 B2 * | 8/2012 | Atkin et al. | ............... | 717/124 |
| 8,527,979 B2 * | 9/2013 | Wookey | ............... | 717/169 |
| 8,566,819 B2 * | 10/2013 | Wookey | ............... | 717/175 |

OTHER PUBLICATIONS

Bai et al, "Design of Intelligent Agents for Collaborative Testing of Service-Based Systems" ACM, pp. 22-28, 2011.*
Letarte et al, "Targeted Genetic Test SQL Generation for the DB2 Database" ACM, pp. 1-6, 2012.*
Elhemali et al, "Unit-testing Query Transformation Rules", ACM, pp. 1-6, 2013.*
Mallouli et al, "A Formal Approach for Testing Security Rules", ACM, pp. 127-132, 2007.*

* cited by examiner

*Primary Examiner* — Anil Khatri
(74) *Attorney, Agent, or Firm* — Lee & Hayes, PLLC

(57) ABSTRACT

Systems and methods for testing in a testing lifecycle are described herein. In one embodiment, the testing system includes an extraction module to extract at least one test case pertaining to a requirement associated with a first build, a modified requirement and an incremental requirement associated with an updated build. Further, an execution module executes the extracted test cases on the build to verify the requirement associated with the build.

8 Claims, 3 Drawing Sheets

AUTOMATIC EXTRACTION OF TEST CASE FOR A BUILD IN TESTING LIFECYCLE

TECHNICAL FIELD

The present subject matter, in general relates to software testing and in particular, to a testing life cycle.

BACKGROUND

Software testing is an important phase in a software lifecycle. The efficiency and profitability of a software organization, in part, depends highly on its testing capabilities. With the rise in the trend to develop modular and large integrated software applications, the complexity of testing this software has increased. Further, advancements in technology provide for large and complex software applications that may include client applications, server applications, development tools, etc., to be built. These applications need to be supported on multiple hardware and software configurations and meet various stringent quality requirements. Thus, with the increased complexity as well as stringent quality requirements to be fulfilled by these software programs, the need for effective testing has increased in order to enable identification of errors that need to be fixed as well as the changes that are required in the functionality of the application.

The complete testing process of a software application, generally referred to as testing lifecycle, includes iterative testing processes that account for large amounts of testing activities and information. These testing activities, testing information, and other related details need to be managed for reasons such as maintaining traceability in the testing lifecycle. For larger testing projects, a larger amount of information and details need to be managed, which is a cumbersome and time consuming task.

SUMMARY

This summary is provided to introduce concepts related to software testing systems. This summary is neither intended to identify essential features of the claimed subject matter nor is it intended for use in determining or limiting the scope of the claimed subject matter.

Systems and methods for testing in an organization are described herein. In one embodiment, the system extracts at least one test case from amongst a plurality of test cases, pertaining to a requirement associated with a first build, a modified requirement or an incremental requirement associated with an updated build. Subsequently, the extracted test cases are executed on the build for verifying the fulfillment of the requirement associated with the build.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION OF THE DRAWINGS

Figure 1:
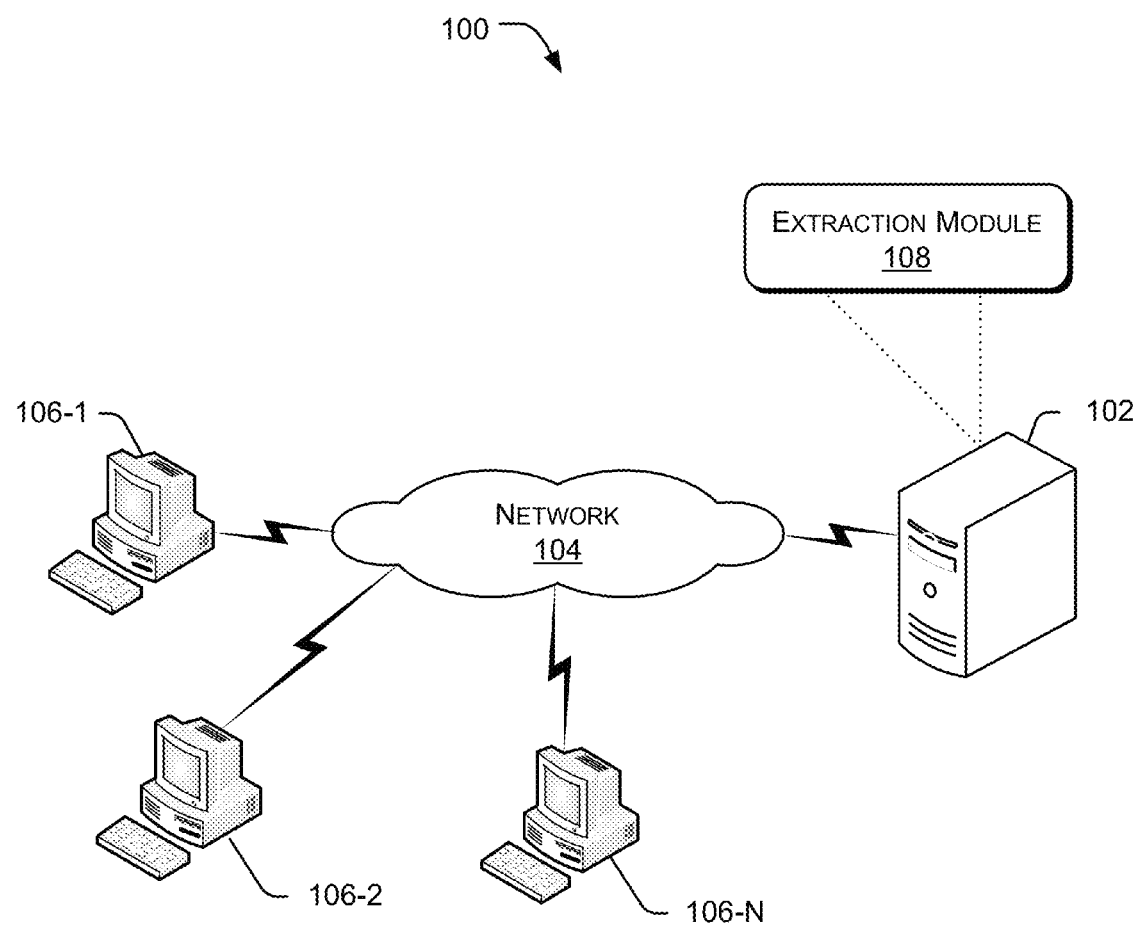
FIG. 1 illustrates an exemplary network environment implementing a testing system, in accordance with an embodiment of the present subject matter.

The subject matter described herein relates to a testing system. Systems and methods related to the testing system as described herein can be implemented in a variety of devices, such as a server, a desktop personal computer, a notebook or a portable computer, a mainframe computer, and in a mobile computing environment.

Typically, a testing lifecycle of a program code, hereinafter referred to as a build, includes a requirements phase; a test plan preparation phase; a test case preparation phase; test execution, defect identification, a communication phase; and release to production phase.

During the requirements phase, a plurality of requirements such as performance and functional requirements to be fulfilled by the build, are identified. The requirements of a build are specific to performance parameters and the functionalities that the build is required to fulfill. For example, a desired runtime for the build can be one requirement, and a desired central processing unit (CPU) usage by the build can be another requirement, etc. These requirements are often defined by a client for whom an application is being developed and are identified and documented by for example, a business analyst. Documentation of the requirements may involve listing the performance as well as the functional requirements of the build in a software requirements specification document.

These requirements are typically communicated to a development team that creates a program code, i.e. the build, for these requirements and simultaneously to a testing team that creates a plurality of test cases for testing these requirements.

The test plan preparation phase includes defining a process of the entire testing to be done on the build by the testing team. For example, the test plan preparation includes the steps and the approach that are to be used to verify and ensure that the build meets the requirements as listed in the software requirements specification document.

The test case preparation phase includes preparation of the test cases in accordance with the requirements of the build. The test cases are scenarios having certain input values to allow generation of certain desired output values when executed on the build. These test cases are executed on the build to verify the fulfillment of the requirements associated with the build. Different requirements may have one or more different test cases associated with it.

Further to preparation of the test cases, the test cases are executed. The test execution and defect identification includes the execution of the test cases on the build to test fulfillment of a given set of requirements, and identification of any defects occurring during the execution of the test cases on the build. Occurrence of a defect indicates failure of a requirement. Subsequent to the identification of the defects, the defects are communicated to the development team in the communication phase so that the development team may rectify the defects. Thereafter, the build may be modified by the development team to remove the defect. The build is tested again iteratively, until there are no more defects identified. Once all the defects are fixed, the build is sent for release in the release to production phase.

In light of the complexities involved in the iterative testing activities, and stringent quality requirements to be fulfilled by the software during the testing activities, various test management systems are conventionally employed by the organizations. These test management systems are employed to maintain traceability of the testing activities of the entire organization. The test management solutions employed in the organizations store the various test details such as requirements, test cases and defects, in a database, which may be used by the testing team to gain visibility into the testing activities of the organization.

However, in the conventional systems, the requirements and the corresponding test cases are searched manually by the users of the test management systems. For example, if a build has a requirement RGUI1 pertaining to a graphical user interface (GUI), and test cases T63, T108 and T43 are to be executed on the build to verify this requirement, then in the conventional systems, a user, such as a member of the testing team is required to manually go through the entire database for locating these required test cases. Owing to the increasingly large number requirements and test cases associated with each requirement, the number of requirements and test cases stored in the database is vast. Accordingly, it is a time consuming and tedious task to manually search the required test cases pertaining to a requirement to be tested in conventional systems.

Moreover, the conventional systems do not take care of the modifications in the build and any corresponding modifications in the requirements and the test cases that may occur. Therefore, in case of a modification in the build, it is required to re-execute all the test cases pertaining to all the requirements associated with the build. This results in wastage of time and testing resources. Further, the conventional systems do not facilitate configurability of the entire testing activity. In other words, the conventional systems do not provide desirable configurability features where a user may define a workflow for the various steps involved in the testing lifecycle, through a user interface. Further, conventional systems do not provide features that enable generation of reports in a user defined format.

To this end, systems and methods for testing are described herein. The testing system as described herein provides an end to end traceability and management of the testing activities. In one embodiment, the testing system as described herein provides automatic extraction of the required test cases for one or more requirements associated with the build. Furthermore, the testing system also allows extraction of test cases relating to incremental requirements and modified requirements associated with an updated build. A build may be updated in order to include modified requirements that failed during a previous testing and/or to include a plurality of incremental or additional requirements. When the build is updated, resulting in the correspondingly modified requirements and/or incremental or additional requirements, the testing system extracts and lists only the test cases linked to the failed or the modified requirements, and/or the incremental requirements associated with the updated build. Therefore, only the test cases linked to the modified requirements, and/or the incremental requirements are to be executed on the updated build. Previous requirements that tested to be satisfactory need not be re-tested, thus, preventing wastage of time and resources.

In a further embodiment, the testing system as described herein enables a regression test for testing all the requirements in one go. The regression test also allows ensures that original requirements and the test cases associated therewith are not affected by the modifications made to other requirements and the test cases in any of the updates made to the build. For the purpose of performing the regression test, the testing system may provide a regression test set that includes a plurality of test cases to test all the requirements.

Furthermore, the testing system as described herein provides change management functionality in order to maintain traceability in the modifications made in the requirements and the corresponding test cases of the build. For this, the testing system stores all the builds, the requirements associated with the build, the test cases, the linking between the requirements and the test cases, the defects as well as all the modifications made to the build, the requirements and the test cases.

In addition, the testing system facilitates the user to define the levels of granularity desired in the generated reports for the builds, the associated test cases and the requirements. For example, the user can select or define the level of details to be viewed in the reports. In another example, reports for different builds can be merged. Also, the reports indicating the requirement that have been tested and the test cases utilized for the purpose, may be used by the user to determine the requirements and test cases that can be reused in other projects and the builds of similar type. Furthermore, the testing system facilitates the user to define the workflows for the testing process. For example, the workflow can include a requirement review workflow, test-cases review workflow or a defect management workflow to define the sequence and/or schedule of the testing process.

In operation, every application is associated with a plurality of requirements, such as those specified by a client. As mentioned previously, these requirements are listed in a requirements specification during the requirements phase. For example, the application 1.1 may have requirements R1-R10 associated with it. A complete set of all the requirements of the application may be a master set of requirements. These requirements are communicated to the development team and the testing team.

The development team creates the program code for the application, hereinafter referred to as the build. As evident the build is required to meet all the predefined requirements. In one embodiment, the entire application may be divided into a plurality of releases, where each release has a one or more builds to be developed and tested. These builds are developed by the development team in an incremental manner. For example, initially, the build is developed for requirement R1 and R2, and is further updated to include additional requirements in an incremental manner, such as the next updated build may be developed to include requirements R3 and R4 in addition to the previously existing requirements R1, R2, and so on.

The testing team, simultaneously, creates a plurality of test cases for testing these requirements. One or more test cases are prepared for testing each of the predefined requirements. As the test cases are prepared, the testing team defines linking rule for the test cases and the requirements the test cases pertains to. Thus, the requirements are linked to one or more of the test cases, during the test case preparation phase. Subsequently, the test cases and the linking rules are stored in the database of the testing system.

In one embodiment, the testing team receives a build for testing, from the development team. As explained above, since the build is developed in the incremental manner, it may not initially be complete with respect to all requirements. Therefore, the development team specifies the requirements that the current build is to be tested for. For example, the development team may specify that it has developed a build for the first two requirements say R1 and R2 out of the master set of the requirements. Therefore, the testing team needs to test the build for only the requirements R1 and R2 and therefore needs only the test cases relevant for requirement R1 and R2. In one embodiment, the specified requirements are selected from the master set of requirements created during the requirements phase.

In said embodiment, the testing team provides the requirements associated with the received build to the testing system. As described previously, the associated requirements with the build have predefined linking to a plurality of test cases created during the test case preparation phase. Therefore, the testing system automatically extracts only the relevant test cases that are required to be executed on the build for the associated requirements based on the pre-defined linking rule. For example, a received build A has two requirements, R1 which indicates a desired runtime of the build, and requirement R2 which indicates a desired CPU usage of the build. In the test case preparation phase, the requirement R1 is linked to test case T3, T5 and T16 and similarly, requirement R2 is linked to test cases T1, T10 and T20. Therefore, the system extracts only the test cases linked to the requirements R1 and R2 of the build, in this case T3, T5 and T16 for the requirement R1 and T1, T10 and T20 for the requirement R2. Automatic extraction of only the relevant test cases out of hundreds of test cases stored in the database saves a lot of time and efforts. Furthermore, the automatic extraction also ensures completeness of the testing process since each requirement and changes therein are exhaustively verified.

Subsequently, the testing system enables the execution of the extracted test cases in a testing platform, in order to verify the fulfillment of requirements associated with the build. In one embodiment, the testing system lists the extracted test cases, pertinent to only the requirements associated with the received build, and provides it to the testing team which can be further executed by the testing team in a testing platform/environment.

Further, as the test cases are executed on the build, a defect which is indicative of a failure of the corresponding requirement may be identified. For example, if the runtime exceeds the desired runtime as set in the requirement R1, then this indicates that the requirement R1 has failed. Such defects are communicated to the development team for fixing the defect. Further, an updated build where the defects are addressed, is received by the testing team from the development team. In one embodiment, an updated build may include a one or more modified requirements that failed in the first build. Additionally, the updated build may include a one or more additional or incremental requirements for which the updated build is to be tested by the testing team. For example, as stated above, the updated build may include the modified requirement R1 and three additional requirements say R3, R4 and R5. Therefore, now the testing team has to test the updated build for the incremental requirements, in this case R3, R4 and R5, and for the modified requirement R1. It may be noted that the requirement R2 that was found satisfactory during the previous testing may not be tested.

In said embodiment, the testing team inputs the new set of requirements associated with the updated build (in this case the requirements R1, R3, R4 and R5) to the testing system. As described earlier, the requirements are linked to a plurality of test cases as defined by the testing team during the test case preparation phase. Therefore, the testing system extracts only the relevant test cases pertaining to only the new requirements, R1, R3, R4 and R5. Therefore, the testing system as described herein enables re-execution of only the test cases linked to the modified requirements and/or the incremental requirements associated with the updated build.

Furthermore, the testing system facilitates the testing team to perform a regression test on the entire build set for release, for all the requirements. The testing system may provide a regression test set that includes all the test cases required to test all the requirement of the build. The regression test enables the testing team to ensure that the requirements of the first build are not affected by other modifications made in the updated build and the requirements. The build is sent for release when it satisfies all the requirements associated with it and all the defects are fixed.

In said embodiment, the testing system also provides version control for the test cases and the requirements. The system provides an end-to-end traceability of the entire testing activities throughout the organization, even for geographically distributed testing teams.

The testing system further provides the user with an option to select baseline versions of the test cases and the requirements and further publish them for subsequent use by other modules in the testing lifecycle. In one embodiment, the users can manually decide which version of the requirement is to be published as the baseline for other modules. For example, in case the requirement R1 has an original version V1 is modified to requirement versions R1 V2, and the requirement version R1 V2 is selected by the user as the final version of the requirement, then the testing system makes the requirement R1 V2 available to other modules in the testing lifecycle, which in turn now treat the requirement R1 V2 as a baseline for further processing. Further, if after setting the requirement R1 V2 to be the baseline for the other modules in the testing lifecycle a further enhanced version of the requirement R1, say R1 V3 is created, then the user can set R1 V3 as the new baseline. Therefore, version V3 of the requirement R1 is now used as the baseline by the other modules in the testing lifecycle. In this case, the testing system as described herein provides parallel processing in the testing lifecycle, as the modules can proceed with the intermediate version of the requirements (in this case version V2) without waiting for the final version.

The testing system as described herein, stores all the requirements, associated test cases, defects, and versions of the requirements and the test cases in a database. In a further embodiment, the database can be searched using keywords for searching the requirements and test cases and the defects. The keyword search feature facilitates easy searching of existing search cases and enables reusability of the same.

In a further embodiment, the testing system generates a plurality of drill down test reports for showing the testing activities in the entire organization in a graphical as well as textual manner. The reports can be further analyzed and studied by the users to know whether the testing activities are on schedule, before schedule or delayed. Additionally, the system provides configuration of workflows for testing processes, through a user interface. Also, the users can email these reports to another user in the organization.

Figure 2:
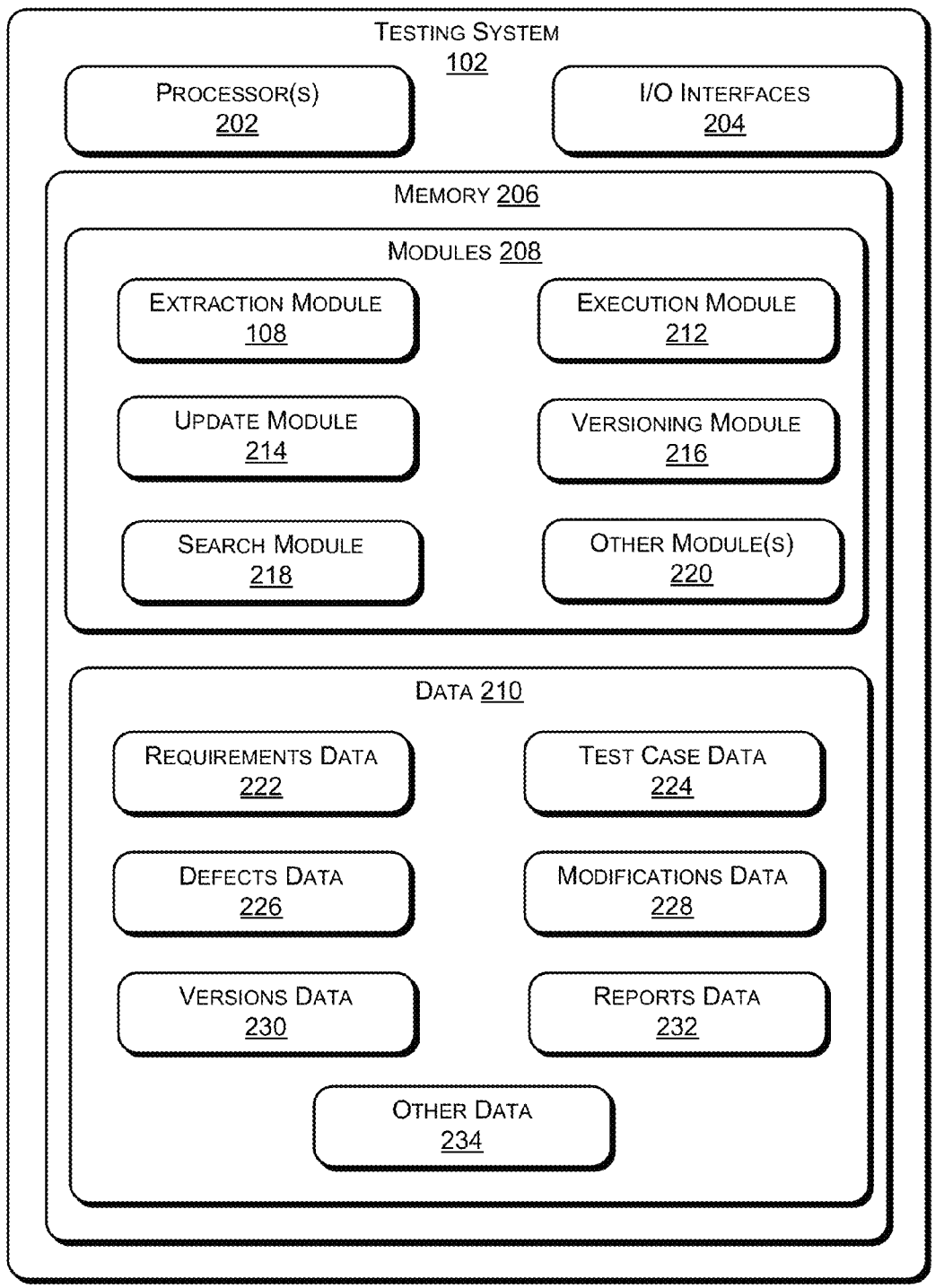
FIG. 2 illustrates an exemplary testing system, in accordance with an embodiment of the present subject matter.
Figure 3:
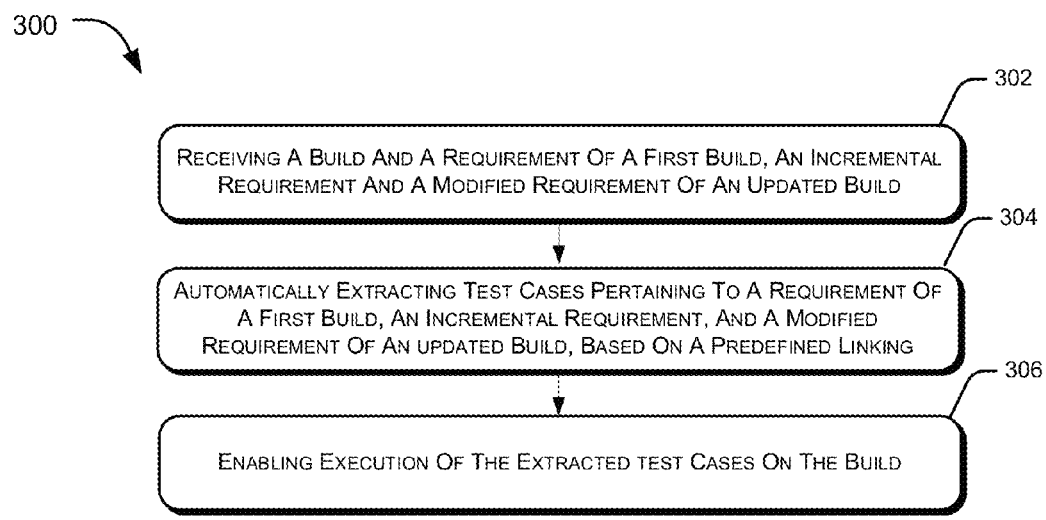
FIG. 3 illustrates an exemplary method for testing in an organization, according to one embodiment with the present subject matter.

The manner in which the testing system is implemented shall be explained in detail with respect to the FIGS. 1-3. While aspects of the systems and methods can be implemented in any number of different computing systems environments, and/or configurations, the embodiments are described in the context of the following exemplary system architecture(s).

FIG. 1 shows an exemplary networking environment 100 implementing a testing system 102 for managing testing activities related to testing of program codes, hereinafter referred to as the build, in accordance with an embodiment of the present subject matter. A build is a compiled version of a program source code that satisfies one or more requirements and which can be deployed in any computing device. Every build developed needs to be tested. Testing of the build can be spread in various stages in the testing lifecycle which may be implemented in modules having similar functionalities and integrated with each other, to provide flexibility in the testing process. The testing system 102 as described herein manages the entire testing lifecycle and provides an end-to-end traceability into the entire testing activities throughout an organization. The networking environment 100 includes the testing system 102, communicating with various client devices 106-1, 106-2, to 106-n through a network 104. The client devices 106-1, 106-2, to 106-n are hereinafter collectively referred to as client devices 106.

The network 104 may be implemented as a wireless network, wired network or a combination thereof. The network 104 can be implemented as one of the different types of networks such as intranet, local area network (LAN), wide area network (WAN) and the internet. The network 104 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the network 104 may include network devices, such as network switches, hubs, routers and host bus adaptors (HBAs), for providing a link between the testing system 102 and the client devices 106. The network devices within the network 104 may interact with the testing system 102 and the client devices 106 through communication links.

The testing system 102 and the client devices 106 can be implemented as any of a variety of computing devices including, for example, a server, a desktop PC, a notebook or a portable computer, a workstation, a mainframe computer, a mobile computing device, an entertainment device or an internet appliance.

As described earlier, every build has predefined requirements associated with it. All the requirements associated with the build may be defined as a master set of requirements for which the build is to be developed and tested. The requirements specification as documented by the business analyst is communicated to the development team and the testing team. The development team prepares builds in an incremental manner by dividing the entire application into a plurality of releases which are constituted of one or more builds. The builds are also generally tested in an incremental manner in accordance with the releases by the development team.

For example, a first build is developed for the requirement R1 to R4, the testing team tests first build and, thereafter, an updated build is developed to fulfill additional requirements R5 to R7 and so on, till all the requirements are fulfilled by the build. The updated build may be an increment of the first build that may satisfy the requirements R5 to R7 in addition to the requirements R1 to R4, thus satisfying the requirements R1 to R7. In one embodiment, the updated build may also be a build, which is modified to meet a requirement that failed during the testing of first build. According, in one embodiment, the updated build may be a modification of the first build that may have been revised to rectify the first build in case one or more of the requirement R1 to R4 failed while testing the first build. Thus, as is evident that incremental requirements and modified requirements may be associated with the updated build.

To test the builds, the testing team creates a one or more test cases for testing each of the requirements. Additionally, the testing team provides a linking rule defining a linkage between the requirements and the test cases, during the test case preparation phase. Subsequently, the test cases, and the linking between the requirements and the test cases are also stored in the database or similar repository.

In one embodiment, when the testing team receives a build for testing it for a set of requirements as specified by the development team, for example, the testing team receives a build A from the development team, and the development team specifies to the testing team that the build is to be tested to the requirement R1 to R3, the testing team has to test the received build only for the requirement R1 to R3. The testing team provides the received build along with the specified requirements to the testing system 102 where all test cases pertaining to the requirement R1 to R3 are automatically extracted from the database and made available for testing. In one embodiment, the testing of the build is done in a networking environment, where, a user, say a member of the testing team may provide the build along with the specified requirements to the testing system 102 through client device 106. Similarly, another user, for example a member of the development team, may receive notification of defects in a tested build from testing system 102 or sent updated builds to the testing system 102 through client device 106.

In one embodiment, the testing system 102 includes an extraction module 108 for extracting the test cases relevant to the specified requirements for the build from the database, based on the pre-defined linking. In the example stated above, on receiving a build A for testing with the requirements R1, R2, R3 and R4, the extraction module 108 of the testing system 102 extracts only the relevant test cases for the specific requirements. Therefore, a user need not manually filter out the relevant test case from amongst the huge number of test cases related all the requirements of the build stored in the database.

Further, the testing system 102 enables execution of the extracted test cases. In one embodiment, the extracted test cases are executed on the build by the testing team in a testing platform/environment in order to verify fulfillment of the specified requirements. In another embodiment, the testing system 102 may be configured to automatically execute the extracted test cases on the build.

Any occurrence of a defect which is indicative of a failure of a requirement during execution of test cases is communicated to the development team along with the associated failed requirement and the defect. In a further embodiment, the testing system 102 stores the identified defects along with the associated requirements and the test cases in the database. The development team, which is responsible for developing and fixing the defects in the build, updates the build to remove the defect.

In said embodiment, the extraction module 108 extracts and lists the test cases based on the modified as well as the incremental requirements associated with the updated build in the form of a test set. For the above example, the testing team provides the requirements R2, R3, R4 and R5 to the testing system 102 that are to be tested on the updated build. As described earlier, these requirements are also from the master set and therefore are linked to a plurality of test cases prepared during the test case preparation phase. Subsequently, the extraction module 108 extracts and lists the test cases linked to the modified as well as the additional requirements associated with the updated build. In one example, all the test cases required to verify defects fixed in an updated build may be provided in a defect verification test set. In one embodiment, the testing system enables the re-execution of the test cases linked only to the modified requirements as well as the test cases linked to the additional requirements associated with the updated build. The extracted test cases, as listed by the extraction module 108 of the testing system 102, are re-executed. For example, if for the build A having the requirements R1, R2 and R3, only the requirement R2 is modified, then the testing system 102 extracts only the test cases linked to the modified requirement R2 and enables re-execution of only the modified test cases and/or the test cases linked to the modified requirements (in this case, test cases linked to the modified requirement R2) instead of re-executing all of them, as done conventionally.

Furthermore, once all the defects are fixed in the build and it satisfies all the requirements as listed in the requirements specification, then the testing system 102 enables the users to perform a regression test. The regression test provides an option to select all the modified requirements, modified test cases or the test cases linked to the modified requirements, as well as the original non-modified requirements and the test cases related thereto to be re-executed. As mentioned previously, the testing system 102 provides the regression test set to enable testing of all the requirements. The regression test set may include each and every test case required to test all the requirements and may be executed during the regression testing. The testing system 102 enables the testing team to ensure that the original requirements of a build are not affected by any subsequent modifications made to the build.

The testing system 102 provides an entire end-to-end traceability through the requirements, the linked test cases and the defects. The testing lifecycle is an iterative process involving the modifications in the requirements or the modification in the test cases based on the modified build or based on the defects identified in the entire testing life cycle of the build. Therefore, the testing system 102 stores all the information about the build, the associated test cases, and the requirements, etc., in order to provide an end-to-end traceability in the testing activities of the organization. The users can gain visibility into the entire testing activity in the organization with the help of the stored requirements, test cases and the associated defects. In one embodiment, the details relating to the testing activities, such as various versions of builds, requirements, defects can be represented in a report format which can be further mailed to another user (say in the development team) in the network 104.

In said embodiment, the testing system 102 maintains a log of all the versions of the modified test cases and/or the modified requirements based on the modifications in the build. In addition, the testing system 102 facilitates the user to define a version of the requirement, or the test cases, that the user wants to set as a baseline for the other modules in the testing lifecycle for further processing. In one embodiment, the users can manually select the version of the requirements and the test cases that can be published as baselines for the other modules in the testing lifecycle. For example, if a requirement R1 has an original version V1 which is modified two times, giving two more versions, say V2 and V3, then the testing system 102 facilitates the user to manually select a version say the version V3 out of the three to be the final version and publish it as a baseline for other modules in the testing lifecycle. Further, the baseline of the requirement R1, in this case the version V3, can be used in the next stage say while sending the build for release. However, if after setting the version V3 to be the baseline for the other modules in the testing lifecycle, a further new enhanced version of the requirement, for example V4 is created. Then the user can now set the version V4 as the baseline. Therefore, the version V4 of the requirement R1 will now be treated as the baseline for further processing by the other modules in the testing lifecycle. In said embodiment, the testing system 102 provides parallel processing in the testing lifecycle, as the modules in the testing lifecycle can proceed with a baseline version of the requirements (in this case the version V3) and the user can simultaneously work and enhance the baselined version even further. Therefore, the testing system 102 does not have to wait for the final version of the requirement in order to proceed to the next stage of the testing lifecycle. In another embodiment, the users can select more than one version of the requirements and/or test cases to be published as a baseline for the other modules in the testing lifecycle. In said embodiment, these versions of the requirements as well as the modified test cases are also stored in the central database for the users to view the entire history of modifications and the versions of the requirements and test cases.

Further, in one embodiment, the testing system 102 generates reports in the form of graphs or presents illustrations on a GUI of the client device 106, such as a dashboard, of the user in order to provide a visibility into the entire testing activities of the organization. In another embodiment, the testing system 102 provides the users to drill down into the reports at a desired level of granularity. For example, the user can view two or more testing projects in the reports, or they can drill down a specific project to a lower level, say requirements for that project. The users can also view a plurality of integrated test reports for a plurality of builds, as provided by the testing system 102. In one embodiment, the generated reports can be in the form of a coverage matrix that illustrates as to how many and which requirements are linked to how many and to which test cases. This enables the users to gain a quick view into the requirements and the linked test cases and hence facilitates reusability of test cases.

In said embodiment, the testing system 102 provides email collaboration for the users, to send as emails the desired reports to another user in the network 104. For example, if a user A wants to send a report for a particular project to a user B, then, he can click on an email button, which sends the report to the desired user, the user B. In one embodiment, a user can be notified by an email notification, for proceeding with a next step as defined in a workflow for the execution of the test cases and the requirements. Thus, the testing system is configured to send emails automatically based on an action predefined in the workflow. Accordingly, in any workflow, certain steps may be identified where an email notification may be generated. In a further embodiment, the email notification can be automatic and user configurable. For example, in a defect workflow, whenever, a defect is identified, an email notification can be sent to the target users, in this case to a development team member in order to fix the defect and modify the build as required. Further, the testing system 102 allows a flexibility to configure email setting to include predefined details such as the subject and body of a mail.

In one embodiment, the testing system 102 is configured to perform a keyword search in searches the entire database for relevant results in the requirements, test cases and the defects. Furthermore, the testing system 102 provides a priority based classification of the search results in order to enable the users to refine their search results as desired. For example, the test cases and/or requirements pulled out as search results against a particular keyword entered by a user, can be classified as high priority, low priority, test cases and/or requirements. Therefore, the users can drill down the search results as desired based on the classifications provided by the testing system 102.

In a further embodiment, the testing system 102 facilitates the users to create and manage workflows for the one or more requirements, test cases and the defects, etc. For example, the workflows can indicate the sequence of execution of the requirements and the test cases, the persons responsible for performing a process step in a review cycle for execution of the requirements, test cases the defects, etc. The testing system 102 provides the users with an option of configuring the workflows of the requirements and test cases as desired. In said embodiment, the testing system 102 provides for configuring of the workflows through a user interface as desired by the user.

In said embodiment, the testing system 102 further tracks the scheduling of the test cases and the requirements through the system generated reports. For example, the users can view the reports and determine whether the test activities are on time, before time or delayed.

FIG. 2 illustrates exemplary components of the testing system 102, in accordance with an embodiment of the present subject matter. In said embodiment, the testing system 102 includes a processor 202, I/O interface(s) 204, and a memory 206. The processor 202 is coupled to the memory 206. The processor 202 may be implemented as one or more microprocessors, microcontrollers, digital signal processors, central processing units, state machines, logic circuitries, and/or any devices that manipulate signals based on operational instructions. Among other capabilities, the processor 202 is configured to fetch and execute computer-readable instructions stored in the memory 206.

The I/O interface(s) 204 may include a variety of software and hardware interfaces, for example, a web interface allowing the testing system 102 to interact with the client devices 106. Further, the interface(s) 204 may enable the testing system 102 to communicate with other computing devices, such as web servers and external repositories or databases. The interface(s) 204 can facilitate multiple communications within a wide variety of networks and protocol types, including wired networks, for example LAN, cable, etc., and wireless networks such as WLAN, cellular, or satellite. The interface(s) 204 may include one or more ports for connecting a number of computing devices to each other or to another server.

The memory 206 can include any computer-readable medium known in the art including, for example, volatile memory (e.g., RAM), and/or non-volatile memory (e.g., EPROM, flash memory, etc.). The memory 206 includes one or more module(s) 208 and data 210. In one embodiment, the module 208 further includes the extraction module 108, an execution module 212, an update module 214, a versioning module 216, a search module 218 and other module(s) 220. The data 210 serves, amongst other things, as a repository for storing data processed, received and generated by the one or more of the module(s) 208. It may be mentioned that the database that stores the requirements, associated test cases and identified defects etc., mentioned previously, may be the memory 206 of the testing system 102 or a data repository associated therewith.

In operation, the extraction module 108 receives a plurality of builds for testing from the testing team. In one embodiment, the received builds can be stored in other data 234. As described previously, the builds have a plurality of requirements associated with them. The requirements may be stored in requirements data 222.

As described previously, the requirements are linked to a plurality of test cases as defined by the linking rule defined during the test case preparation phase. In further embodiment, the test cases are stored as test case data 224 along with the linking rules that link the requirements to the test cases.

Subsequently, the aforementioned extraction module 108, extracts only the relevant test cases for a specific requirement of the received build, based on the received linking of the test cases and the requirements. Furthermore, the extraction module 108 communicates the extracted test cases in the form of a test set, the requirements, and the build to the execution module 212.

Further, the execution module 212 of the testing system 102 enables execution of the extracted test cases for the build, corresponding to specific requirements. In one embodiment, the extracted test cases can be executed by a testing team in a testing platform/environment. In one embodiment, the execution module 212 may be configured to automatically execute the extracted test cases.

In a further embodiment, the execution module 212 of the testing system 102 identifies any defects occurring while executing the test cases on the build. A defect is identified when the build fails to confirm to the desired requirement. In an embodiment, the execution module 212 indicates the identified defects to the development team for modifications to remove the defect in the build. The modified build received from the development team is provided to the update module 214 of the testing system 102. Additionally, an incremental build, discussed previously, may also be provided to the update module 214. In other words, the updated build including the modified build and/or the incremental build is provided to the update module 214. In one embodiment, a modified requirement can also be communicated to the testing team, which may involve creation or modification the test cases in accordance with the modified requirements. In said embodiment, the modifications in the build, the requirements, the test cases and the linking are stored in the central database as modifications data 228.

In a further embodiment, the update module 214 communicates the received modifications in the build, and the requirements, the test cases or both, to the extraction module 108. Thereupon, the extraction enables extraction of only the test cases linked with the modified requirements and/or the incremental requirements. In one embodiment, the execution module 212 allows re-execution of test cases extracted by the extraction module 108. In one embodiment, the update module 214 also communicates to the extraction module 108, a list hereinafter referred to as a regression test set, of all the test cases and the requirements associated with the build for performing the regression test previously described.

In addition, the versioning module 216 of the testing system 102 stores the versions of the requirements and the test cases in versions data 230. In said embodiment, the versions include the modified requirements, the incremental requirements, modified test cases and new or additional test cases. The versioning module 216 facilitates the user to select any version of the requirements to be the final one and publish it as a baseline for other modules in the lifecycle. Furthermore, the versions and the baselines are also stored in the versions data 230.

In another embodiment, the search module 218 of the testing system 102 allows the users to perform a keyword search to locate test cases, requirements, builds and versions thereof that relate to the keyword.

In further embodiments, the other module 220 of the testing system 102 may include a report generation module (not shown in fig.) to generate a plurality of reports for the testing lifecycle from the various data such as the requirements, test cases, linking, modifications of the build, and the versions of the requirements, and the test cases. In said embodiment, the users can view the generated reports to a desired level of granularity. For example, the users may select an integrated view of reports related to more than one build, a single report of one build, or the users can further drill down to specific requirements or test cases of the build. In one embodiment, the generated reports are in the form of a coverage matrix that indicates as to how many and which requirements are linked to how many and which test cases.

In an embodiment, the other module 220 of the testing system 102 may also include a communication module (not shown in fig.) to an interface the testing system 102 to electronic mailing facilities to send the reports to a desired user in the network 104. In addition, the users can track status through the reports, such as to determine whether the projects are on time, before time or delayed.

In further embodiment, the other module 220 of the testing system 102 may include an interface module (not shown in fig.) to allow the users to define configurable workflows for the requirements, test cases and the defects using interface of the client devices 106. For example, the users can configure a schedule and a sequence of the requirements, test cases and defects to be executed. Thus the interface module allows tracking of schedules for the testing of the builds. In a further embodiment, the users can define the workflow for a review cycle, which means, which person in the team is responsible for what step of the process for executing the workflow associated with requirements, the test cases, the defects, etc.

FIG. 3 illustrates an exemplary method 300 for testing, in accordance with the present subject matter. The exemplary method 300 may be described in the general context of computer executable instructions and may be a computer implementable method. Generally, computer executable instructions can include routines, programs, objects, components, data structures, procedures, modules, functions and the like that perform particular functions or implement particular abstract data types. The method may also be practiced in a distributed computing environment where functions are performed by remote processing devices that are linked through a communication network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method, or an alternate method. Additionally, individual blocks may be deleted from the method without departing from the spirit and scope of the subject matter described herein. Furthermore, the method can be implemented in any suitable hardware, software, firmware, or a combination thereof In accordance with one embodiment of the present subject matter, the method 300 may be implemented in the previously described testing system 102. However, it will be appreciated by one skilled in the art that such an embodiment is not limiting. The method 300 may be implemented in a variety of similar testing systems.

The method 300 is initiated at block 302 upon the receipt of a first build or an updated build for testing along with the set of requirements for which the build is to be tested. In case the first build is received, the first build has a set of associated requirements for which it needs to be tested. In case an updated build is received, then a plurality of incremental requirements and/or modified requirements is received with the updated build. In one embodiment, the extraction module 108 receives the build along with the requirements At block 304, one or more test cases, from amongst a plurality of test cases available in the database, pertaining either to the requirements associated with a first build or the incremental requirements as well as the modified requirements of the updated build, are extracted. The extraction is automatically performed by the extraction module 108 based on the pre-defined linking rule pre-defined during the test case preparation phase. Automatic extraction of the relevant test cases out of hundreds of test cases stored in the repository saves a lot of time and resources and ensures that the testing is exhaustive and that none of the requirements are left untested. In one embodiment, the execution module 212 enables the execution of the extracted test cases on the received build or the received updated build.

Further, at block 306, the extracted test cases pertaining to the requirements of the received build are enabled to be executed on the build. In said embodiment, the testing team may execute the extracted test cases on a testing platform/environment. In another embodiment, the execution module 212 may be configured to automatically execute the extracted test cases on the received build or the received updated build. Furthermore, any defects occurring while executing the test cases on the build are identified for rectification. The modified/updated build is thereafter retested in several iterations until all the requirements of the build are satisfied.

Although embodiments for testing have been described in language specific to structural features and/or methods, it is to be understood that the present subject matter is not necessarily limited to the specific features or methods described. Rather, the specific features and methods are disclosed as exemplary embodiments for test management in an organization.

We claim:

1. A testing system comprising:
a processor; and
a memory coupled to the processor, the memory comprising:
an update module, comprising computer-readable instructions executable by the processor, configured to:
receive one of a modified requirement associated with an updated build and an incremental requirement associated with the updated build, wherein the modified requirement is a modified version of an original requirement that failed during testing of a first build and the incremental requirement is a new requirement added to the original requirement;
an extraction module, comprising computer-readable instructions executable by the processor, configured to:
compile a plurality of requirements, a plurality of test cases, and pre-defined linking rules to link at least one test case, from amongst the plurality of test cases, with one of the plurality of requirements, in a database, and
extract the at least one test case based at least on the pre-defined linking rules, wherein the at least one test case is linked to one of the requirement associated with the updated build and the modified requirement associated with the updated build;
a versioning module configured to:
store at least one version of at least one requirement of the plurality of requirements and the at least one test case; and
an execution module configured to:
enable execution of the at least one test case extracted by the extraction module.

2. The testing system as claimed in claim 1, wherein the versioning module is further configured to publish a version as a baseline for the testing system, wherein the baseline is selected from the at least one version of the at least one requirement, and the at least one test case.

3. The testing system as claimed in claim 1, wherein the testing system further comprises an interface module configured to provide a user interface for defining a workflow associated with a testing of the first build and the updated build.

4. The testing system as claimed in claim 3, wherein the interface module is further configured to track schedules for the testing of the first build and the updated build.

5. The testing system as claimed in claim 1, wherein the testing system further comprises a search module configured to search at least one of the modified requirement and the incremental requirements, the at least one test case, the first build, and the updated build, based at least in part on a keyword provided by a user.

6. A computerized method comprising:

compiling, by the processor, a plurality of requirements, a plurality of test cases, and pre-defined linking rules to link at least one test case, amongst the plurality of test cases, with one of the plurality of requirements, in a database of the testing system;

receiving, by the processor, one of a modified requirement associated with an updated build having and an incremental requirement associated with the updated build, wherein the modified requirement is a modified version of an original requirement that failed during testing of a first build and the incremental requirement is a new requirement added to the original requirement of the first build;

extracting, by the processor, the at least one test case based on the predefined linking rules, wherein the at least one test case is linked to at least one of the incremental requirement associated with the updated build and the modified requirement associated with the updated build;

storing, by the processor, at least one version of at least one requirement of the plurality of requirements and the at least one test case; and enabling execution, by the processor, of the at least one extracted test case on the build, to verify the requirement of the at least one build.

7. The method as claimed in claim 6 further comprising linking, by the processor, the at least one requirement to the at least one test case.

8. The method as claimed in claim 6 further comprising defining, by the processor, one or more of a workflow and a schedule for the testing.

* * * * *